(12) United States Patent
Hampson et al.

(10) Patent No.: US 6,341,927 B2
(45) Date of Patent: *Jan. 29, 2002

(54) TAMPER REISTANT FASTENER

(75) Inventors: Kip Hampson; Todd Ivanochko; Linda Young, all of Edmonton (CA)

(73) Assignee: Pinhead Components Inc., Edmonton (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,642

(22) Filed: Jul. 23, 1999

(51) Int. Cl.[7] .................................. F16B 23/00
(52) U.S. Cl. ..................... 411/403; 411/910; 81/461
(58) Field of Search ................. 411/402, 403, 411/405, 910, 911; 81/461, 176.15, 177.7, 177.2

(56) References Cited

U.S. PATENT DOCUMENTS

| | | | | |
|---|---|---|---|---|
| 2,770,998 | A | * 11/1956 | Schwartz | |
| 3,313,198 | A | * 4/1967 | Walton | 411/911 |
| 4,302,137 | A | * 11/1981 | Hart | 411/910 |
| 5,033,501 | A | * 7/1991 | Stehling | 411/405 |
| 5,280,740 | A | * 1/1994 | Ernst | 81/177.7 |
| 5,340,256 | A | * 8/1994 | Morgan | 411/405 |

FOREIGN PATENT DOCUMENTS

| | | | | |
|---|---|---|---|---|
| FR | 2338628 | * | 8/1977 | 411/405 |
| IT | 480235 | * | 3/1954 | 411/402 |

* cited by examiner

*Primary Examiner*—Flemming Saether

(57) ABSTRACT

A tamper resistant fastener, which can only be rotated with a specific key, is described. The fastener includes a head for rotation about a vertical axis. The head is provided with the least two cutouts in the head of the faster spaced away from the vertical axis, the cutouts having a discontinuous sidewall. The side wall of each of the cutouts has a first generally vertical engaging surface for engagement by a mating member on a specific key for clockwise rotation of the head about the vertical axis and a second generally vertical engaging surface for engagement by the mating member on the specific key for counter clockwise rotation of the head about vertical axis. The side wall of the cutout is interrupted adjacent the second engaging surface to prevent engagement by a tool other than the specific key and thereby prevent rotation of the fastener in a counter clockwise direction by a tool other than the specific key.

14 Claims, 3 Drawing Sheets

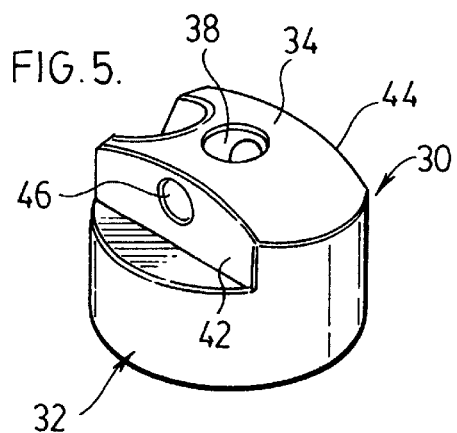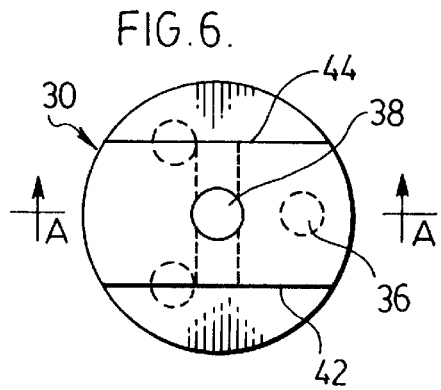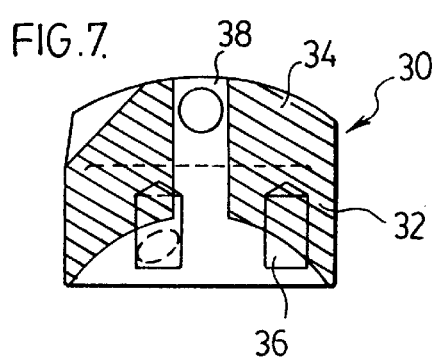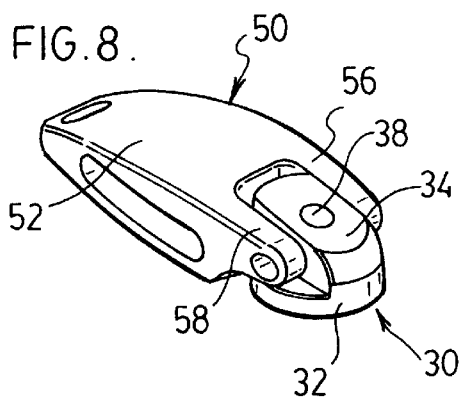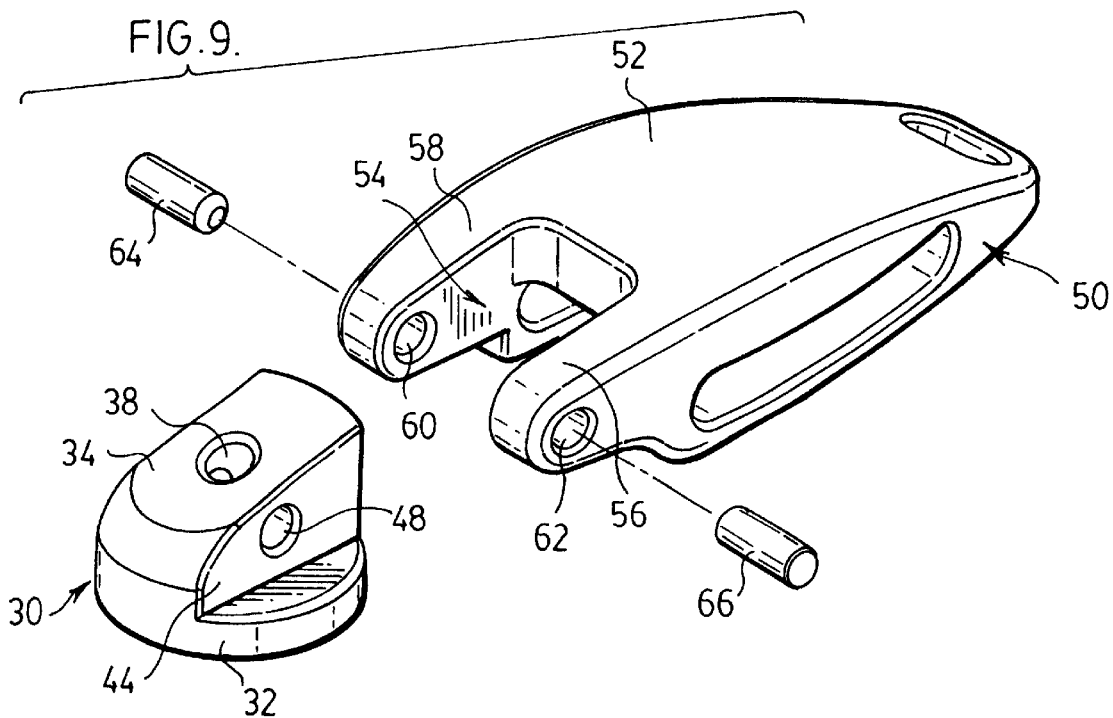

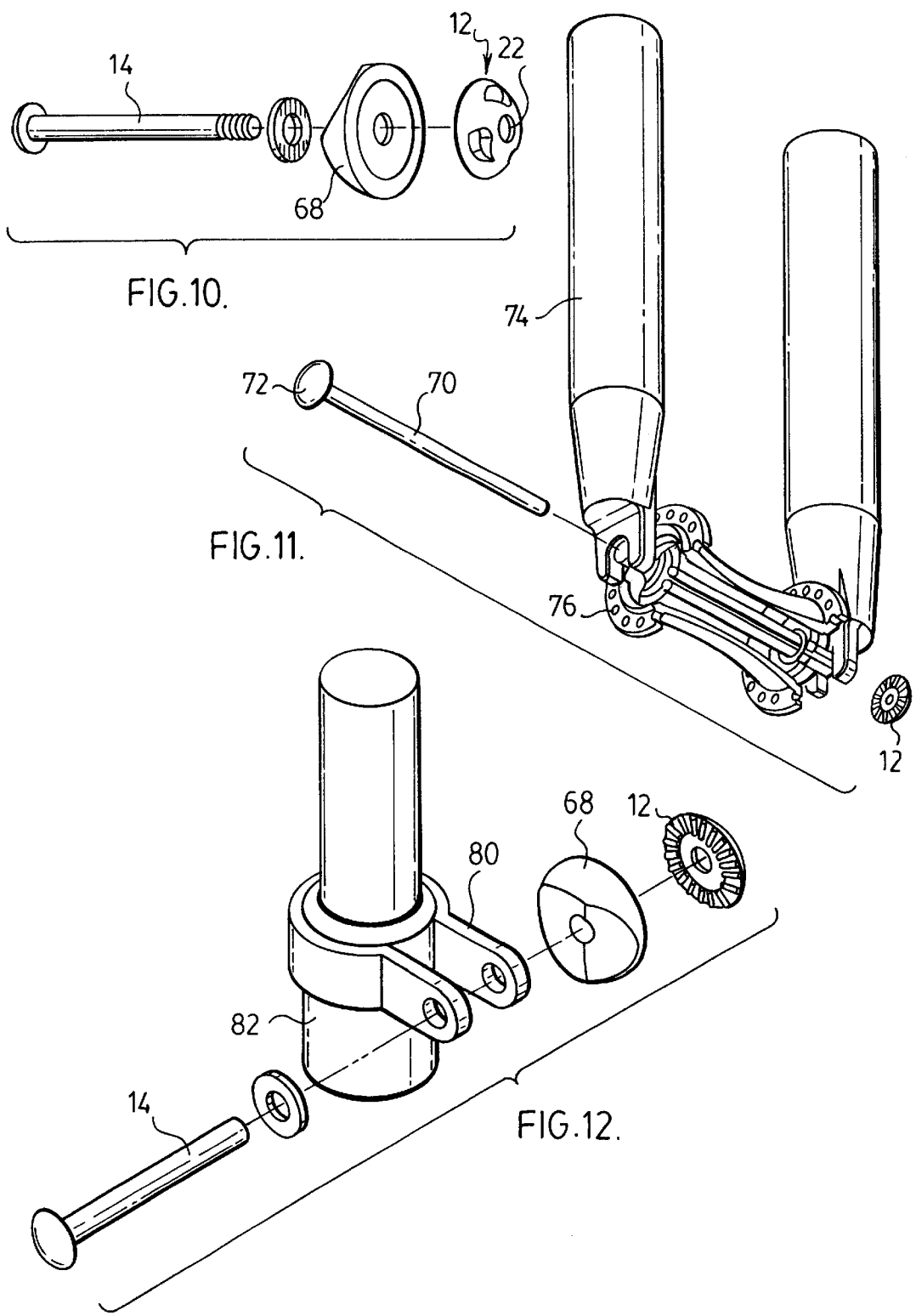

TAMPER REISTANT FASTENER

FIELD OF THE INVENTION

The present invention relates to fasteners such as nuts for threaded bolts and the like, which are designed to be resistant to tampering thereby offering security against unwanted removal.

BACKGROUND OF THE INVENTION

It is common in many applications to secure objects using threaded fasteners such as a nut and bolt combination where both the nut and bolt have cooperating threads. The nut is secured onto the bolt by the use of a suitable tool such as a wrench. The use of a nut and bolt combination provides a very secure attachment of objects, however, since the same commonly available tool is typically used to remove the nut, it is not possible to prevent unwanted removal. For this reason, various devices known as tamper-proof fasteners have been suggested which offer an element of security against unwanted removal. A key feature commonly incorporated into the design of such tamper-proof fasteners is a smooth outer surface, which makes it difficult to grasp with commonly available tools such as wrenches. A further key feature of tamper-proof fasteners is to design such fasteners to require a special key for tightening and releasing the fastener. Examples of such tamper resistant fasteners are given in the applicant's previous U.S. Pat. No. 5,863,166 and other U.S. patents including U.S. Pat. Nos. 5,199,838, 4,674,306, 4,302,137, 4,125,051, 4,018,011, and UK patent application number 2,095,356.

Applicant's previous U.S. Pat. No. 5,863,166 describes a device for attaching bicycle components to the bicycle frame. The device comprises a threaded bolt with a corresponding nut having a rotatable casing surrounding the outer surface and a key for engaging the nut. The key and the end face of the nut have at least one spigot and at least one hole such that the spigots of each fit in the holes of the other.

U.S. Pat. No. 5,199,838 teaches a nut for a threaded bolt, which has a spherical top surface and cylindrical sides. The nut is provided with a plurality of apertures into which fit complementary pins on a specially designed key. In this manner, only the uniquely complementary key can be used to turn the nut. Although such design makes removal difficult, it is still possible to rotate the nut using other tools such as needle nose pliers etc.

U.S. Pat. No. 4,674,306 describes a vehicle and assembly locking and wrenching apparatus where the vehicle lock is provided with the key for the tamperproof fastener. The tamperproof fastener is provided by a nut having an incised front face and arcuate sides parallel to the face surrounded by a cylindrical annular ring to prevent the gripping and turning of the nut.

U.S. Pat. No. 4,302,137 teaches a nut provided with a plurality of apertures. As before, a specially designed key with complementary pins is used to turn the nut. As a further security measure, this device is provided with a rotating collar, which makes it difficult to grasp the nut with common tools. A design of this type is complicated thereby adding to the manufacturing cost. Further, it is prone to the same type of tampering as in the '838 patent discussed above.

U.S. Pat. No. 4,125,051 teaches a tamperproof fastener including a threaded shank and a head, which has a smooth circular side surface and a flat top surface. The top surface of the head is provided with a plurality of radially extending flanges, which cooperate with complementary flanges on a specific key. In one embodiment, the '051 device allows for a removable fastener but it is indicated that reverse rotation of the fastener is not as efficient as the engagement direction. Thus, if the fastener is engaged too tightly, removal may not be possible.

U.S. Pat. No. 4,018,111 teaches a fastener having an axially extending threaded shank and a head having a smooth circular sidewall. The head also has a flat top surface with an offset aperture for receiving a complementary pin on a special key. The fastener is associated with a circular washer having a smooth frustoconical sidewall, which extends over the head thereby forming a smooth outer surface when the fastener is secured. This type of arrangement prevents tampering with a wrench, screwdriver or other such tool.

UK Patent Application teaches an antitheft device having a bolt with a cylindrical head surrounded by a rotatable cylindrical shell. The bolt head is provided with holes in a given pattern and the complementary key has extending pins in the same pattern as the holes and a hexagonal head capable of being engaged by a wrench. Once again, this design is expensive to manufacture While a number of tamperproof fasteners have been developed, there still remains a need for a tamper resistant fastener or nut, which overcomes the deficiencies of the known devices.

SUMMARY OF THE INVENTION

In a preferred embodiment, the present invention provides a tamper resistant fastener which can only be rotated with a specific key. The fastener includes a head for rotation about a vertical axis. The head is provided with the least two cutouts in the head of the fastener spaced away from the vertical axis, the cutouts having a discontinuous sidewall. The side wall of each of the cutouts has a first generally vertical engaging surface for engagement by a mating member on a specific key for clockwise rotation of the head about the vertical axis and a second generally vertical engaging surface for engagement by the mating member on the specific key for counter clockwise rotation of the head about vertical axis. The side wall of the cutout is interrupted adjacent the second engaging surface to prevent engagement by a tool other than the specific key and thereby prevent rotation of the fastener in a counter clockwise direction by a tool other than the specific key.

In an aspect of the invention, the head has an upper convex surface extending to a bottom surface.

In another aspect of the invention, the head is provided with three cutouts spaced around the periphery of the head.

In yet another aspect of the invention, the cutouts have a generally circular mating member receiving recess, the discontinuous side wall being formed by removing material form the head adjacent the second generally vertical surface. The mating members of the key are generally circular projections extending downwardly from the lower surface.

Yet another aspect of the invention provides for a tamper resistant fastening system comprising a tamper proof fastener for attaching objects, the tamper proof fastener having a head for rotation about a vertical axis, and a specific key for rotating the fastener. The head of the fastener is provided with at least two cutouts spaced away from the vertical axis, the cutouts having a discontinuous sidewall. The side wall of each of the cutouts has a first generally vertical engaging surface for engagement by a mating member on the specific key for clockwise rotation of the head about the vertical axis and a second generally vertical engaging surface for engagement by the mating member on the specific key for counter clockwise rotation of the head about vertical axis. The side wall of the cutout is interrupted adjacent the second engaging surface to prevent engagement by a tool other than the specific key and thereby prevent rotation of the fastener in a counter clockwise direction by a tool other than the specific key.

BRIEF DESCRIPTION OF THE DRAWINGS

Preferred embodiments of the present invention are illustrated in the attached drawings wherein:

FIG. 5 is a perspective view of a key for the nut of FIG. 1 according to one embodiment;

FIG. 6 is a top plan view of the key of FIG. 5;

FIG. 7 is side elevation view in cross section of the key of FIG. 5;

FIG. 8 is a perspective view of a key and lever assembly using the key of FIG. 5;

FIG. 9 is an exploded perspective view of the key and lever assembly of FIG. 8;

FIG. 10 is a perspective view of a second embodiment of a tamper proof fastener according to the present invention for use with a bicycle seat assembly;

FIG. 11 is a perspective view of the fastener of FIG. 1 being used to attach a wheel hub assembly of a bicycle; and FIG. 12 is a perspective view of the fastener of FIG. 11 being used in a bicycle seat assembly

DETAILED DESCRIPTION OF THE PREFERRED EMBODIMENTS

Figure 1:
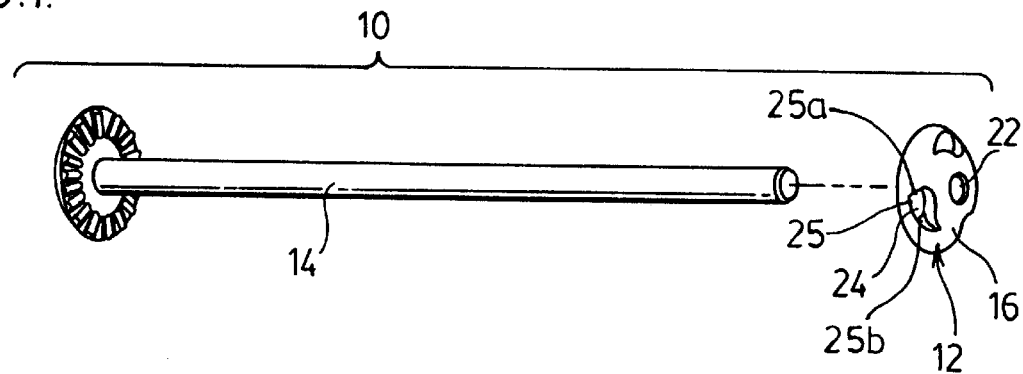
FIG. 1 is an exploded perspective view of a first embodiment of a tamper-proof fastener according to the present invention.
Figure 3:
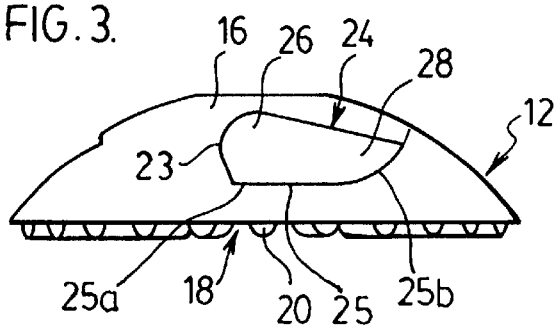
FIG. 3 is a side elevation of the nut of FIG. 1.
Figure 4:
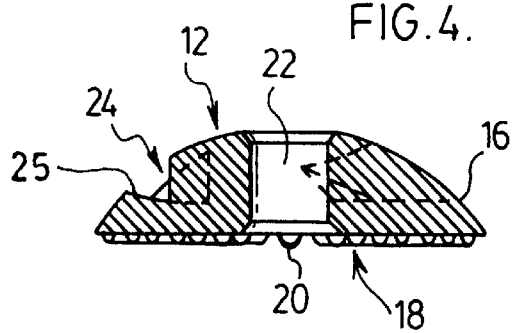
FIG. 4 is a side cross sectional elevation of the nut of FIG. 1.

FIG. 1 illustrates a first preferred embodiment of a tamper-proof fastener 10 in accordance with the present invention. The tamper proof fastener 10 includes a nut 12 and a suitable bolt 14 or other such threaded shaft. The nut 12 is provided with a top surface 16, which is not easily gripable or pickable, by ordinary tools such as wrenches or pliers or the like. In the preferred embodiment illustrated, the top surface 16 has a smooth generally spherical cross section although as described below, other shaping to the top surface is possible. The nut preferably has no side walls with the top surface 16 extending downward to meet a bottom surface 18. As illustrated in FIGS. 3 and 4, the bottom surface 18 is preferably provided with a gripping surface such as a plurality of ridges or teeth 20. The nut 12 is also provided with a central bore 22 extending axially through the nut. In the preferred embodiment, the bore 22 is threaded so as to cooperate with the similarly threaded bolt 14 or shaft. The nut top surface 16 also includes a plurality of cutouts 24, which in the preferred embodiment illustrated, are three cutouts 24, extending axially through the nut 12 although not necessarily completely therethrough. Cutouts 24 are not threaded and are adapted to receive a projection extending from a key as will be discussed below.

Figure 2:
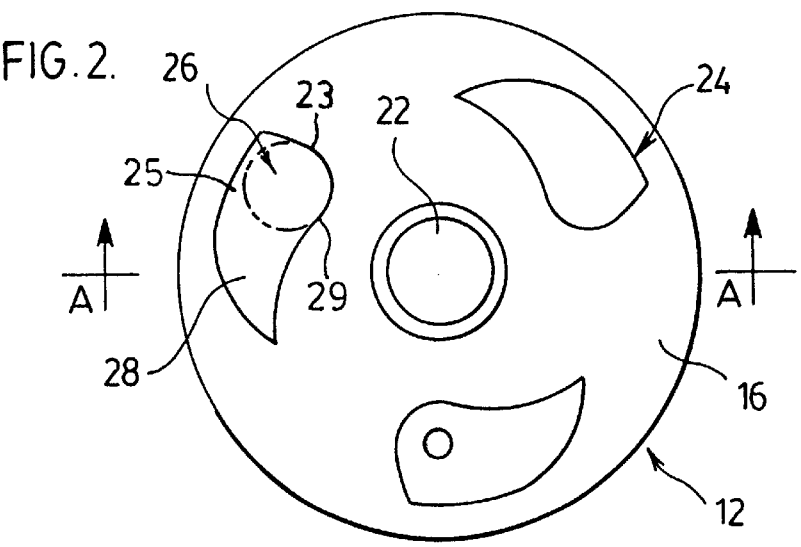
FIG. 2 is a top plan view of the nut of FIG. 1.

As illustrated in FIGS. 2 to 4 the cutouts 24 preferably have a floor portion 25 and a circular shaped head 26 with a discontinuous sidewall although shapes other than circular may be used as will be described below. The discontinuous sidewall is preferably provided by removing a portion of the sidewall of the circular shaped head 26 and the material of the top surface 16 of the fastener adjacent the circular shaped head 26 to form an extending tail 28 to provide a generally circular mating member receiving recess and give the cutout 24 the appearance of an eyebrow or reverse comma. Floor portion 25a in the area of circular shaped head 26 is generally normal the axis of the fastener; floor portion 25b in the extending tail portion 28 of the cutout slopes away from floor portion 25a and from bottom surface 18 as seen in FIGS. 1 and 3. This sloped floor portion helps guide a key member into the proper location on the fastener as will be described hereinafter. Furthermore this sloped portion makes the fastener more difficult to grip with a tool such as a needle nose pliers as such tool will tend to slide along the slope and off the tool when torque is applied. The material removed from the circular shaped head 26 is part of the sidewall which will interact with the mating member on a key during counter clockwise rotation of the fastener. As will be explained in further detail below, the portion of the sidewall opposite the extending tail 28 provides the first generally vertical engaging surface for interaction with the mating member of the key for clockwise rotation of the fastener. The portion of the sidewall adjacent the inside wall of the extending tail 28 provides the second generally vertical engaging surface for interaction with the mating member on the key for counterclockwise rotation of the fastener. Removing part of the sidewall which would generally interact with the mating member during counterclockwise rotation leaves sufficient sidewall to interact with the mating member of the key, but not enough of the sidewall to permit a mismatched tool such as a needle nose pliers to apply sufficient torquing force to enable removal of the fastener. Together with the sloped floor portion 25b, this configuration makes the subject fastener very difficult to remove without a proper key.

FIGS. 2 to 4 also illustrate the relative locations of the cutouts 24 and the central bore 22 in accordance with one embodiment of the invention. As will be explained below, a large number of variations in size and relative positioning of the cutouts 24 are envisioned as embodiments of the invention. Such variability provides a further security feature to the invention. The cutouts 24 are located radially away from the central bore 22 on the top surface 16 of the nut 12 preferably in positions such that no two of the cutouts 24 align with the central bore 22. In this way, should one attempt to remove the fastener by using, for example, needle nose pliers, the force is applied off center and not in a manner to allow for easy removal. The orientation and shaping of the cutouts causes slipping of the tool with no easy means of gripping of the fastener by the tool.

FIGS. 5 to 7 illustrate a key 30 for use with the nut 12. The key 30 includes a nut engaging portion 32 and a handle engaging portion 34. The nut engaging portion 32, as shown in FIG. 7, is contoured concavely to match the shape of the top surface 16 of the nut 12 so as to fit thereover. As shown in the preferred embodiment, the nut engaging portion 32 would reflect the generally spherical top surface 16 of the nut 12. As best illustrated in FIGS. 6 and 7, the key 30 includes a number of mating members to match the number of cutouts 24 in the head of the fastener. In the preferred embodiment illustrated where the cutouts 24 have a circular head 26, the mating members are provided by a number of generally circular projections 36 extending downwardly to match the number of cutouts 24 in the nut 12. The projections 36 are preferably formed integral with the key 30 by manufacturing the key by a casting, molding or forming operation as described below. In the embodiment illustrated, the key 30 has three such projections 36, each of which engages a cutout 24 of the nut 12. The key 30 also includes a central opening 38 which allows any portion of the bolt 14 that may pass through the nut 12 to extend therethrough so that proper engagement of the nut 12 may be attained.

The handle engaging portion 34 includes two opposing flanges, 42 and 44, which include openings 46 and 48, respectively. Openings 46 and 48 serve as hinge points for a handle 50 as shown in FIG. 9. The handle 50 comprises a leverage arm 52 having a hinge portion 54. Hinge portion 54 preferably includes a pair of axial extensions 56 and 58 having, respectively, openings 60 and 62. In order to attach the handle 50 to the key 30, a pair of pins 64 and 66 are extended through each of the openings on the key and the handle. In this manner, one pin 64 is extended through openings 46 and 60 while the other pin 66 is extended through openings 48 and 62. Such an arrangement allows the handle 50 to pivot about the pins 64 and 66 and provides sufficient leverage to turn the key 30 when it engages the nut 12.

FIG. 10 illustrates a second preferred embodiment of a fastener according to the present invention being another combination of a nut 12 and a bolt 14 adapted to attach a seat post to a bicycle. The bolt 14 includes an at least partially threaded portion, which engages a similarly threaded central bore 22 of the nut 12. The fastener of this embodiment includes an adapter 68 to adapt the generally flat bottom surface of the nut to the rounded surface of the seat post clamp. The adapter 68, in addition to be used with the fastener of the present invention, is also usable in other applications requiring a flat surface of a fastener to be attached to a round or other non-flat surface. The adapter 68 has a flat lower surface for contact with the nut or other fastener and a concave top surface. Preferably, to enhance the security of the attachment between the adapter 68 and nut, the flat lower surface of the adapter is provided with an upstanding rim to surround the edge of the nut. The presence of the rim prevents a tool from being able to grip the edge of the nut and also prevents a tool such as a screwdriver or chisel from being inserted under the nut. As illustrated in the figures, the top surface is preferably provided with a second concave portion at an angle to the first concave portion. In this way, the adapter is usable not only with simple rounded surfaces but also with surfaces that may be offset or of other shapes.

The operation of the nut 12 and key 30 combination will now be discussed. A nut 12 is threaded onto a bolt 14 or other such item where the nut 12 is to be secured. When the nut 12 is to be tightened, a key 30 specific to the cutouts 24 of the nut top surface 16 is placed thereover such that the projection 36 of the key 30 are inserted into the cutouts 24 of the nut 12. The extending tail 28 allows for easier insertion of the key 30 onto the fastener 10 as is not necessary to properly align the projections 36 of the key 30 with the circular recesses 26. Rather the key 30 is rotated on the nut 12 in a clockwise manner such that the projection 36 ride along the tails 28 of the cutouts 24 until they enter the mating member receiving circular recess 26. The interaction of the projection 36 and the first generally vertical engaging surface of the circular mating member receiving recess 26 join the key 30 and nut 12 so that any torsional force applied to the key 30 is transferred to the nut 12 thereby enabling rotation thereof. In a similar manner, when removal of the nut 12 is desired, the same key 30 is placed over the nut top surface 16 and turned first clockwise to seat the projections 36 in the mating member receiving circular recesses 26. An opposite rotational force is then applied to the key 30, which due to the interaction of the projection and the second generally vertical engaging surface, rotates the nut 12. The handle 50 is provided to increase the torque applied to the key 30 thereby assisting in the tightening or loosening of the nut 12.

As will be understood, the specificity of the key and nut combination is achieved in part by the spatial arrangement of the cutouts 24 on the nut top surface 16. Such arrangement is correlated to the arrangement of the projections 36 of the key 30. For example, with three cutouts 24 evenly spaced around the nut 12, there will be 120° between any two adjacent cutouts 24. The spacing between the cutouts 24 may be varied to provide for unique combinations. The spacing between the cutouts 24 can be varied over a broad range so long as preferably no two of the cutouts 24 align with the central opening 22. Preferably, for three cutouts 24, the spacing between the cutouts 24 varies between about 100° and 140°, more preferably between about 105° and 135°. By maintaining close manufacturing tolerances as little as a five degree variation in the spacing may be sufficient. The variation in the spacing prevents a key 30, which does not have the complementary spacing of the mating members from being utilized to remove the nut 12. The mismatched mating members will not be able to properly enter into and engage the recesses of the cutouts 24 and thus will not be able to exert enough force to remove the nut 12. Rather, the mating members will ride along the extending tail 28 and the key 30 will disengage from the nut 12.

Further, in other embodiments, a plurality of cutouts 24 such as four or five or more may be provided. Additionally, the shaping of the cutouts 24 and mating members may be varied to give even more combinations. Some of the possible variations in shaping include D-shaped, elliptical, triangular, etc, as well as many others. If non-circular cutouts and mating members are used, the orientation may be varied to provide even more combinations. For example, with D-shaped cutouts, the orientation of the flat of the D-shape to the central axis may be varied. In this way, even with the same spacing between the cutouts, by varying the orientation of the flat, more combinations are possible. To yield even more combinations, the individual cutouts of the nut may vary such as a circular cutout and two D-shaped cutouts. This further increases the number of possible combinations. As can be seen, a multitude of arrangements are possible thereby resulting in a unique nut and key combination. In the result, only the specific key can be used on a given nut thereby preventing any tampering or unwanted removal.

As discussed above, the preferred embodiment of the nut 12 as illustrated in the figures has a partially spherical surface. However, it will be appreciated that any smooth inclined surface is also possible. The feature of the nut surface is that it does not have any horizontal surfaces perpendicular to the axis of rotation of the nut. Such a design thereby prevents any turning of the nut with conventional wrenches etc. For example, the nut may have a pyramidal or frustoconical structure and may, in plan view, also be elliptical or parabolic.

As illustrated in the Figures, the nut 12 of the invention may also have a bottom surface 18, which includes a plurality of teeth 20 which provide a gripping surface for the part against which the nut is tightened. Such teeth 20 provide an additional force against any torque applied to the nut in a loosening direction. In such manner, the teeth 20 make it more difficult to remove the nut without the respective key.

It will be appreciated by those skilled in the art that the mating members 36 of the key 30 bear the torquing force when the nut 30 is being tightened or loosened. As such, the dimensions and material of the key 30 is selected to accommodate such forces. The selection of the particular material is dependent upon the physical size of the fastener and the forces encountered in its use. These properties depend in turn upon the specific application for the fastener. Depending upon the application and the tensile strength required, the fastener may be constructed of a suitable metal such as steel, aluminum, stainless steel, alloys of any of these metals such as zinc alloys, or other metallic materials. Other possible materials for the fastener could include plastics or composites such as glass composites having the requisite tensile strength. The selection of the material is well within the ordinary skill in the art.

The fastener and key of the present invention may be manufactured by many different processes depending upon the material selected and the type of fastener and its complementary key to be produced. Some of the processes by which the fastener and key may be manufactured include molding, preferably injection molding, forming such as powder forming and cold forming, casting such as die casting precision casting and sand casting, machining including CNC machining, and many other processes. The selection of the best method for manufacturing the fastener will depend upon many factors such as the material to be selected, the type of fastener, the volume to be produced and the costs and selling price of the fastener. Those of skill in the art will be readily able to select the optimum method based upon their knowledge and taking the above and other factors into account.

For example, in the embodiment illustrated for use in bicycle applications, a nut 12, as illustrated in FIG. 1, would have an overall diameter of approximately 0.8" a central bore with a diameter of approximately 0.2" and a height of approximately 0.213". In such case, the circular mating member receiving recesses 26 of the cutouts 24 of the nut 12 would have a diameter of approximately 0.125". The projections 36 of the respective key 30 would therefore be of a similar diameter. The above dimensions apply for a nut 12 and key 30 made of 316 stainless steel.

The above discussion was focused on a nut 12 and threaded bolt 14 combination wherein the nut 12 is separate from the bolt 14. However, in other embodiments, it is possible for the nut 12 to be attached to the bolt 14 to form a fastener. Further, the fastener can be in the form of a screw with the head having the shape and arrangement as the nut 12 described above.

Preferred embodiments of the invention will now be described by means of specific examples wherein the nut and key combination can be used.

EXAMPLE 1
Bicycle Axle

As mentioned above, one application of the present invention is in securing the wheels of a bicycle to the frame. In the usual case, hexagonal bolts are used to secure the bicycle wheel to the forks on the frame. The bolts are tightened onto to a threaded axle using a wrench or other similar tool. The axle may for a 24", 26", or 28" wheel as known in the art. The problem inherent in this arrangement is that the nut is removed using the same commonly available wrench. In the result, anyone is able to remove the nut and, therefore, the wheel. The present invention serves to prevent such event by providing a nut which can only be removed by a specific key held by the owner. Further, the smooth top surface 12 of the nut prevents it from being grasped by a tool such as a wrench etc.

In one embodiment both sides of the bicycle axle would have a nut as taught herein. In another embodiment, the axle 70 can be as illustrated with one end having a smooth flange 72 which cannot be rotated with a tool and the opposite end having a threaded portion as usual. The threaded portion can then be inserted through the frame 74 and wheel 76. The exposed threaded portion can then be secured with a nut 12 as taught herein.

EXAMPLE 2
Bicycle Seat

In a similar manner, it is possible to secure a bicycle seat to the frame. In this case a bolt 14 as illustrated in FIGS. 10 and 12 would extend through a clamp 80 on the bicycle frame 82 and be secured with a nut 12 of the present invention. As shown, the bolt 14 comprises a shaft including a head at one end and a threaded portion on an opposite end. The nut 12 is threaded onto the threaded portion and tightened with the respective key 30 thereby securing the seat to the bicycle frame.

EXAMPLE 3
Bicycle Handlebars

Bicycle handlebars are secured to the frame by means of a long threaded bolt with a fixed head adapted to be rotated by a wrench or Allen key. In one embodiment of the present invention, the head of the handlebar bolt can be replaced with one having the surface as in the nut taught herein. In this way, only the specific key can be used to remove the handlebars.

EXAMPLE 4
Other Fasteners/Locks

In other embodiments, the nut of the present invention can be fixed onto any device where a locking mechanism is used such as in strong boxes or bicycle locks. In such cases, the nut can be placed on the exterior of the lock or box and the specific key used to turn same. In this manner, the nut of the present invention can be used on bicycle locks or bicycle racks etc.

Further, the nut of the invention can be used on computers or safes etc. where tamper resistant locking is required. The tamper resistant fastener of the present invention may be used in any application where it is desired to attach or lock members together in a manner to prevent removal. Some of the areas in which the fastener of the present invention may be used include automotive applications such as wheel nuts, roof rack locks, bicycle mounts, etc., building applications such as locking screws for partition wall attachment, other sporting applications such as cable locks, trigger guard locks, lockers, equipment boxes, etc., and many other applications such as luggage and briefcase locks.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A tamper resistant fastener system comprising:
    a head having a smooth, rounded top surface and a longitudinal axis;
    at least two cutouts extending into said top surface, and,
    a key having a head engaging portion and at least two depending mating members each having a periphery and a radius; wherein,
    each of said cutouts includes a sidewall parallel to said longitudinal axis and a floor normal to said longitudinal axis, said floor being bounded along a first side by said sidewall and being unbounded along a second side; and, said sidewall including a first portion extending in a generally radial direction from said axis and a second portion running in a generally circumferential direction, said second portion including a recess having a radius equal to the radius of said at least two depending members and a shape complimentary to a portion of the periphery of said at least two depending mating members.

2. A tamper resistant fastening system according to claim 1 wherein the head of the fastener is provided with three cutouts spaced around the periphery of the head and said key has three depending mating members, wherein said spacing between said cutouts from one fastener to another is varied to provide different combinations to prevent one key from operating all fasteners.

3. A tamper resistant fastening system according to claim 2 wherein the spacing between the cutouts varies between 100° and 140°.

4. A tamper resistant fastening system according to claim 2 wherein the spacing between the cutouts varies between 105° and 135.

5. A tamper resistant fastening system according to claim 2 wherein the cutouts have a mating member receiving recess with a shape selected from the group consisting of generally circular, D-shaped, elliptical and triangular.

6. A tamper resistant fastener system according to claim 1 wherein said cutouts are positioned such that no two cutouts align with the longitudinal axis of the head.

7. A tamper resistant fastening system according to claim 6 wherein at least two of said cutouts have mating member receiving recesses of different shapes.

8. A tamper resistant fastening system according to claim 6 wherein said cutouts have generally circular mating member receiving recesses.

9. A tamper resistant fastener comprising:

a head having a smooth, rounded top surface and a threaded central bore with a longitudinal axis; and, at least two cutouts extending into said top surface, wherein, each of said cutouts includes a sidewall parallel to said longitudinal axis and a floor normal to said longitudinal axis, said floor being bounded along a first side by said sidewall and being unbounded along a second side;

said sidewall including a first portion extending in a generally radial direction from said central bore and a second portion running in a generally circumferential direction;

wherein, along said second portion, the distance from said sidewall to said central bore increases in the direction away from said first portion; and, wherein said floor includes a flat portion adjacent said first portion of said sidewall and a sloped portion between said flat portion and said top surface.

10. The fastener of claim 9 wherein said sidewall second portion includes a concave portion.

11. The fastener of claim 10 wherein said sidewall second portion includes a convex portion.

12. The fastener of claim 9 wherein said sidewall second portion includes a convex portion and a concave portion between said convex portion and said sidewall first portion.

13. A tamper resistant fastener comprising:

a threaded shaft having a longitudinal axis;

a head having a smooth, rounded top surface connected to said shaft; and, at least two cutouts extending into said top surface, wherein, each of said cutouts includes a sidewall parallel to said longitudinal axis and a floor normal to said longitudinal axis, said floor being bounded along a first side by said sidewall and being unbounded along a second side;

said sidewall including a first portion extending in a generally radial direction from said central bore and a second portion running in a generally circumferential direction;

wherein, along said second portion, the distance from said sidewall to said central portion increases in the direction away from said first portion; and, wherein said floor includes a flat portion adjacent said first portion of said sidewall and a sloped portion between said flat portion and said top surface.

14. The fastener of claim 13 wherein said sidewall second portion includes a concavity.

* * * * *